(12) United States Patent
Sawall et al.

(10) Patent No.: US 9,926,001 B2
(45) Date of Patent: Mar. 27, 2018

(54) STEERING COLUMN FOR A MOTOR VEHICLE

(71) Applicants: ThyssenKrupp Presta AG, Eschen (LI); ThyssenKrupp AG, Essen (DE)

(72) Inventors: Stefan Sawall, Gams (CH); Daniel Kreutz, Feldkirch (AT); Sebastian Forte, Mauren (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/318,118

(22) PCT Filed: Jun. 17, 2015

(86) PCT No.: PCT/EP2015/063597
§ 371 (c)(1),
(2) Date: Dec. 12, 2016

(87) PCT Pub. No.: WO2015/193375
PCT Pub. Date: Dec. 23, 2015

(65) Prior Publication Data
US 2017/0137051 A1  May 18, 2017

(30) Foreign Application Priority Data
Jun. 18, 2014  (DE) .......................... 10 2014 108 577

(51) Int. Cl.
*B62D 1/184* (2006.01)
*B62D 1/187* (2006.01)
*B62D 1/19* (2006.01)

(52) U.S. Cl.
CPC ............. *B62D 1/195* (2013.01); *B62D 1/184* (2013.01); *B62D 1/187* (2013.01)

(58) Field of Classification Search
CPC ........ B62D 1/184; B62D 1/185; B62D 1/187; B62D 1/19; B62D 1/192; B62D 1/195
See application file for complete search history.

(56) References Cited

U.S. PATENT DOCUMENTS 6,039,350 A * 3/2000 Patzelt .................. B62D 1/184
280/775
6,419,269 B1 * 7/2002 Manwaring ............ B62D 1/195
280/775

(Continued)

FOREIGN PATENT DOCUMENTS

DE         196 17 561 C1    9/1997
DE   60 2004 009 678 T2    8/2008

(Continued)

OTHER PUBLICATIONS

English translation of International Search Report for International patent application No. PCT/EP2015/063597; dated Sep. 8, 2015.

(Continued)

*Primary Examiner* — Laura Freedman
(74) *Attorney, Agent, or Firm* — thyssenkrupp North America, Inc.

(57) ABSTRACT

A steering column for a motor vehicle may include a support element, an adjusting element that is displaceable relative to the support element for the rotatable mounting of a steering spindle, and a locking device for locking the adjusting element relative to the support element in a crash event. The locking device may include a blocking element disposed on the support element, which can be brought into engagement with an engagement part of the adjusting element. Further, a switching element may be provided for bringing about the engaging of the blocking element in the engagement part in a crash event. The switching element may bring about the engaging based on its mass inertia.

20 Claims, 4 Drawing Sheets

(56) References Cited

U.S. PATENT DOCUMENTS

| | | | |
|---|---|---|---|
| 7,735,868 B2 * | 6/2010 | Ridgway | B62D 1/184 280/775 |
| 8,403,364 B2 * | 3/2013 | Monteil | B62D 1/195 280/775 |
| 8,500,168 B2 * | 8/2013 | Goulay | B62D 1/184 280/777 |
| 8,689,659 B2 * | 4/2014 | Schnitzer | B62D 1/195 280/777 |
| 8,827,311 B2 * | 9/2014 | Schnitzer | B62D 1/184 188/371 |
| 8,894,097 B2 * | 11/2014 | Sulser | B62D 1/184 280/777 |
| 9,233,707 B2 * | 1/2016 | Domig | B62D 1/192 |
| 2006/0181070 A1 | 8/2006 | Imamura et al. | |
| 2010/0282016 A1 * | 11/2010 | Oehri | B62D 1/184 74/493 |
| 2011/0115206 A1 | 5/2011 | Sulser et al. | |
| 2015/0239490 A1 * | 8/2015 | Sakata | B62D 1/195 74/493 |
| 2016/0159387 A1 * | 6/2016 | Okano | B62D 1/184 74/493 |
| 2016/0214637 A1 * | 7/2016 | Blattler | B62D 1/184 |

FOREIGN PATENT DOCUMENTS

| | | |
|---|---|---|
| DE | 10 2008 034 807 B3 | 10/2009 |
| DE | 10 2008 007 093 B3 | 11/2009 |
| DE | 10 2008 016 742 A1 | 11/2009 |
| DE | 102008034803 B3 | 1/2010 |

OTHER PUBLICATIONS

English language Abstract for DE102008007093B3 listed above.
English language Abstract for DE102008034803B3 listed above.

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2015/063597, filed Jun. 17, 2015, which claims priority to German Patent Application No. DE 10 2014 108 577.9 filed Jun. 18, 2014, the entire contents of both of which are incorporated herein by reference.

FIELD

The present disclosure generally relates to steering columns for motor vehicles, including steering columns in which an adjusting element is displaceable relative to a support element to provide a position adjustment of a steering wheel and/or a crash system.

BACKGROUND

Steering columns are known, in which an adjusting element is displaceably arranged relative to a support element. For example, a jacket tube, in which the steering spindle of a steering column is rotatably mounted, can be displaceably arranged relative to the support element in the direction of the steering spindle axis, in order to make possible an adjustability of the position of the steering wheel arranged at an end of the steering spindle to the respective sitting position of the driver. Furthermore, such a displaceability of an adjusting element relative to the support element is significant with respect to the crash safety of the steering column. In particular, a yielding of the steering wheel in the event of a crash is frequently demanded, in particular when the absorption effect of the steering wheel airbag is used up and the driver strikes the steering wheel. Here it is usual to design the yielding of the steering wheel in an energy-absorbing manner through the arrangement of an energy absorption element between the adjusting element and the support element. An energy absorption element can for example absorb kinetic energy by way of a deformation of a plate strip or a tearing-open of a plate strip.

Accordingly it is demanded that the adjusting element can be easily displaced relative to the support element when a position adjustment of the steering wheel is performed. The position adjustment of the steering wheel can take place either manually by the vehicle driver or by way of an electrical, pneumatic or hydraulic adjusting mechanism. Furthermore, a defined, fixed intervention between support element and adjusting element during driving and in particular in the event of a crash is demanded in order to initially make possible a defined supporting of the airbag on the adjusting element and then an energy-absorbing yielding of the adjusting element relative to the support element, in order to be able to carefully dissipate the crash energy for the driver over as long as possible a path.

Different systems for locking the adjusting element relative to the support element are known from the prior art. There, the locking of the adjusting element relative to the support element is usually provided via an adjusting mechanism usually subject to the intermediate connection of an energy absorption element, by means of which adjusting mechanism the displaceability of the adjusting element relative to the support element is performed for the position adjustment to a driver.

From DE 10 2008 016 742 B4 a blocking hook is known, which is actuated by actuating the clamping lever of an adjusting mechanism and which when closing the adjusting mechanism while driving accordingly comes into engagement with a crash element.

From DE 10 2008 034 803 B3 a blocking mechanism is likewise known, which is actuated by the stroke of the clamping system of the adjusting mechanism. Accordingly, the blocking devices require a certain stroke of the clamping mechanism and furthermore predetermine the respective latching during the positioning of the adjusting element during normal driving.

DETAILED DESCRIPTION

Figure 1:
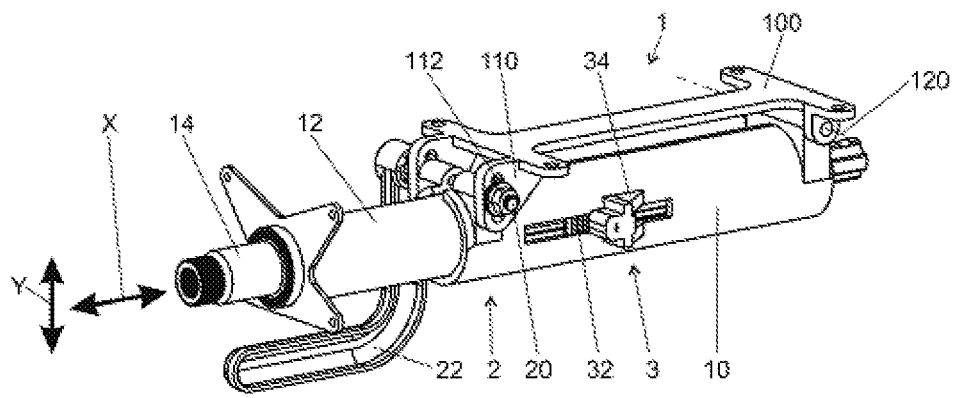
FIG. 1 is a schematic perspective view of an example steering column.
Figure 2:
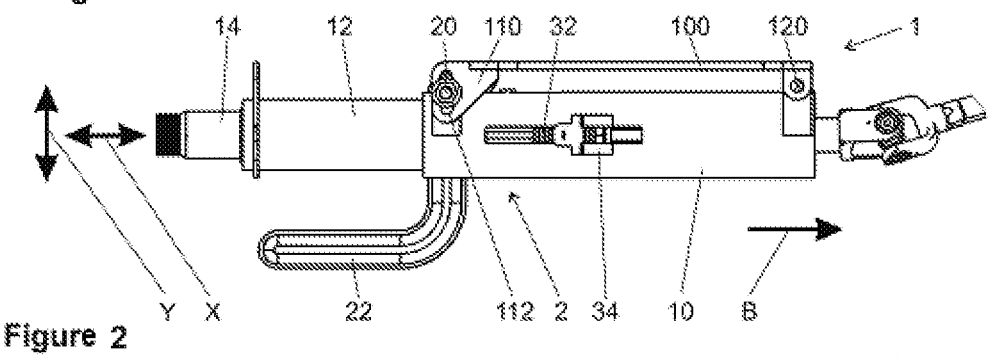
FIG. 2 is a schematic lateral view of the steering column of FIG. 1.
Figure 3:
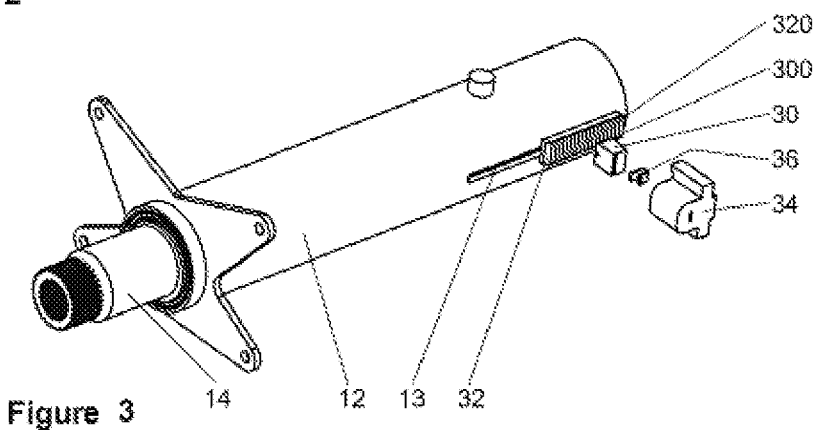
FIG. 3 is a schematic perspective view of an example adjusting element and an example blocking element of the steering column of the preceding figures.
Figure 4:
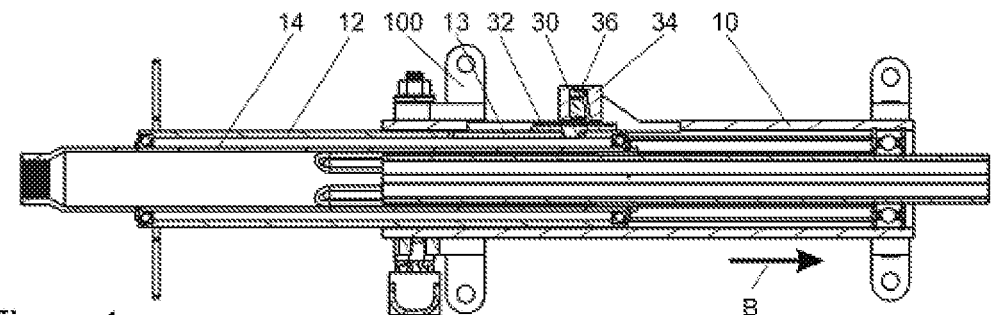
FIG. 4 is a schematic longitudinal sectional view through the steering column of the preceding figures.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Starting out from the known prior art, one example object of the present disclosure is to provide a steering column that makes possible an improved positioning of the steering wheel.

Accordingly, a steering column for a motor vehicle comprising a support element and an adjusting element that is displaceable relative to the support element is proposed for the rotatable mounting of a steering spindle, comprising a locking device for locking the adjusting element relative to the support element in the event of a crash, wherein the locking device comprises a blocking element arranged on the support element, which can be brought into engagement with an engagement part of the adjusting element. According to the invention, a switching element for bringing about the engaging of the blocking element in the engagement part in the event of a crash is provided, wherein the switching element brings about the engaging based on its mass inertia, wherein the movement direction of the switching element is distinct from the movement direction of the blocking element.

The abrupt deceleration in the event of a crash brings about a targeted repositioning of the switching element because of the active mass inertia force on the switching element in the driving direction, wherein the targeted repositioning of the switching element brings about or releases the engaging of the blocking element in the engagement part. In order to make possible a movement of the blocking element in the direction of the engagement part of the adjusting element, the relocation of the switching element takes place in a different movement direction deviating from said direction. For example, the switching element can be moved in the traveling direction into a triggering position, so that the blocking element can be brought in a movement direction transverse, for example perpendicular to the traveling direction or perpendicular to the displacement direction of the adjusting element, into engagement with the engagement part. The event of a crash is to mean a head on vehicle collision, which results in a deceleration of the vehicle.

Because of the fact that the switching element is provided, which brings about the engaging of the blocking element on the basis of its mass inertia, a crash-secure locking of the adjusting element relative to the support element can be omitted during normal driving. Here, the position of the adjusting element relative to the support element can rather be determined merely by way of an also continuously configured clamping. Only when in the event of a crash a predetermined acceleration is exceeded is the blocking element brought into engagement by means of the switching element on the basis of its mass inertia so that the movement of the adjusting element with respect to the support element is blocked.

The blocking movement of the adjusting element relative to the support element is to mean the movement for the position adjustment of the adjusting element, however the adjusting element can be displaceable relative to the support element subject to an energy absorption.

Accordingly, an improved positioning of the adjusting element relative to the support element during normal driving can be achieved in this manner, since the geometrical conditions of a crash mechanism need not be taken into account.

Furthermore, the use of an electrical steering column adjustment is also possible in this way, in the case of which no crash locking has to be provided via the respective electromotive drives so that accordingly these drives can be dimensioned more cost effectively. The actual crash locking is then provided via the blocking element combined with the moveable switching element, wherein the switching element can be correspondingly moved from the rest position into the switching position because of its mass inertia.

Preferably, the blocking element is preloaded into the blocking position so that upon a corresponding switching of the switching element the blocking element because of its preload provides a corresponding locking between the support element and the adjusting element.

Preferably, the switching element can be moved between a rest position, in which the blocking element is held out of engagement with the engagement part, and a triggering position, in which the blocking element is in engagement with the engagement part. Thus, a reliable triggering of the locking can be achieved via the switching element.

Preferably, the blocking element for engaging can be moved in a direction substantially perpendicular to the axis of the steering spindle, namely in an angular range of +/−10° or less. Accordingly, as high as possible a locking force and quick switching or locking can be provided.

Preferably, the switching element is formed by the blocking element and the mass inertia of the blocking element brings about the engaging. In this way, further switching elements can be omitted and a simple and cost-effective design is achieved.

Preferably, the blocking element is designed as a blocking block, which is moveably arranged in the vehicle movement direction in a blocking element receptacle on the support element. Here it is particularly preferred when the blocking element is held in the blocking element receptacle in a rest position in an undercut, since such a construction can be achieved with few parts and accordingly cost effectively. A defined triggering of the engaging can be achieved in that between the undercut of the blocking element receptacle and a holding section of the blocking element a rolling element is arranged. Rolling elements can be embodied as classic rolling bodies such as balls, cylinder rollers or needles.

In a preferred further development, the blocking element is of a self-locking design and comprises a wedge surface directed in particular in the traveling direction, which can be brought to lie against a mating wedge surface of the blocking element receptacle in the event of a crash in order to achieve a self-locking of the blocking element. In this way, secure locking can be achieved independently of a preload spring.

Preferably, the switching element comprises a mass body and holds the blocking element in a rest position via a locking pin. Here it is particularly preferred to mount the locking pin via rolling bodies in a locking groove of the blocking element. The locking pin can be connected to the mass body via a lever arm in order to achieve an increase of the triggering force or a reduction of the mass of the mass body.

Particularly preferably, at least two locking devices are provided, preferably on sides of the adjusting element located opposite one another, in order to establish a redundancy or to be able to dimension the individual locking devices smaller. Furthermore it is possible with at least two locking devices to create a dependency on the vehicle speed that is present directly before the event of a crash and the active deceleration in the event of a crash. For this purpose, the mass inertias of the switching elements can be adapted and varied so that either only one or more switching elements based on their active mass inertia force bring/s about the engagement of the respective blocking element.

To reliably dissipate crash energy, the engagement part is preferably configured as energy absorption element. Here, an assembly consisting of elongated hole and displacement bolt can serve as energy absorption element, in the case of which by a shifting of the displacement bolt, which is connected to the engagement part, a deformation is brought about in the elongated hole or an expansion of the elongated hole is brought about and thus energy is absorbed. Furthermore, the engagement part can interact with a bending strip, bending wire or a bending-tearing strap, wherein the crash energy is absorbed through the plastic deformation. The blocking element can likewise be embodied as a plane, which is in engagement with the engagement part so that because of the slicing contour of the blocking element a chip is severed from the engagement part upon a displacement between blocking element and engagement part.

The switching element can be provided as a separate element, which holds a blocking element that is preloaded in the blocking direction in a rest position, and which then, because of its mass inertia, is moved in the event of a crash when a certain acceleration or a certain impulse is exceeded and accordingly releases the blocking element. In order to be able to overcome the necessary actuation forces, in particular against the preload of the blocking element, the switching element can either be provided with a correspondingly high inert mass or it can utilize the corresponding mass inertia via a lever mechanism so that a reliable moving from the rest position into the triggering position is provided even under the preload of the blocking element.

In a further preferred embodiment, the blocking element itself is simultaneously formed as switching element. Here, the blocking element can be arranged under preload and displaceable in the direction of the axis of rotation of the steering spindle in a corresponding holder in order to be moved out of a rest position into the triggering position upon the action of an impulse in order to then clamp the movement of the adjusting element relative to the support element because of the preload of the blocking element.

In a further preferred embodiment, the blocking element is displaceably arranged in a corresponding holder and at an angle to the axis of rotation of the steering spindle, in order to be correspondingly moved out of a rest position into the triggering position upon the action of an impulse in order to then clamp the movement of the adjusting element relative to the support element on the basis of the preload of the blocking element. The angle to the axis of rotation of the steering spindle is preferentially selected so that the displacement of the blocking element takes place horizontally or in other words parallel to the road on which the motor vehicle is located.

An advantageous embodiment of the invention provides that the blocking element is arranged on the support element in a blocking element receptacle and is preloaded by means of a preload spring in the direction of the engagement part, wherein the blocking element in the event of a crash or upon generating a correspondingly high acceleration or a correspondingly high impulse onto the switching element can be brought into engagement with the engagement part because of the preload of the preload spring. The preload spring exerts a spring force onto the blocking element by way of which the blocking element can be moved in the direction of the engagement part when the movement is released in the event of a crash. Releasing in the event of a crash is effected in that the switching element because of its mass inertia is moved relative to the blocking element receptacle in a movement direction which differs from the movement direction of the blocking element in the blocking element receptacle in the direction of the engagement part.

In the following, preferred exemplary embodiments are described by way of the figures. Here, identical or similar elements or elements having the same effect are marked in the various figures with identical reference characters and a repeated description of these elements is partly omitted in the following description in order to avoid redundancies.

In the FIGS. 1 to 5, a steering column 1 is shown in a first exemplary embodiment, wherein a support element 10 and an adjusting element 12 that is adjustable relative to the former are provided. The adjusting element 12 is formed as a jacket tube and rotatably mounts the steering spindle 14. In a known manner, the steering spindle 14 serves to transmit the steering command introduced by a driver via a steering wheel arranged on the end of the steering spindle 14 facing the driver into the steering system.

The support element 10 can be connected in a fixed manner to the chassis of the motor vehicle via console parts 100. The support element 10, in the shown exemplary embodiment, can be pivoted about a pivot axis 120 in order to make possible a height adjustment of the adjusting element 12 in pivot direction Y. The adjusting element 12 can be displaced relative to the support element 10 in displacement direction X in order to provide a longitudinal adjustment accordingly.

In the shown exemplary embodiment, the support element 10 provides a clamping sleeve for the adjusting element 12 so that the adjusting element 12 can be held relative to the support element 10, via a clamping mechanism 2, displacement-fixed via a force fit. To this end, a clamping axis 20 is provided, which can be actuated by means of a clamping lever 22 and which is arranged in cheeks 110 of the console part 100 in an elongated hole 112 which substantially extends in pivot direction Y. When the clamping mechanism 2 is locked by a corresponding pivoting of the clamping lever 22 and thus actuating of a cam mechanism, the cheeks 110 of the console part 100 are clamped towards the inside, as a result of which at the same time the support element 10 formed as clamping sleeve is simultaneously preloaded so that a displacement of the adjusting element 12 in displacement direction X just as a pivoting of the adjusting element 12 about the pivot axis 120 is prevented by the force fit. Accordingly, a stepless adjustment of the adjusting element 12 both in pivot direction Y and also in displacement direction X is possible because of the simple clamping mechanism.

However, in order to achieve a secure locking of the adjusting element 12 relative to the support element 10 in the event of a crash and accordingly avoid that the adjusting element 12 in the event of a crash is simply pushed into the support element 10, a locking device 3 is provided. The locking device 3 is described in the following in detail in a plurality of embodiments. In the exemplary embodiment shown in FIGS. 1 to 5, the locking device 3 comprises a blocking element 30, which is formed as a blocking block and which on a side facing the adjusting element 12 comprises a toothing 300. The toothing 300 can engage in a corresponding mating toothing 320 of an engagement part 32 arranged on the adjusting element 12 and accordingly bring about a locking of the adjusting element 12 relative to the support element 10. The blocking element 30 accordingly supports itself on the support element 10.

The blocking element 30 is arranged on the support element 10 in a blocking element receptacle 34 and preloaded in the direction of the engagement part 32 by means of a preload spring 36. This arrangement is particularly clearly seen in FIG. 5. In the rest position shown in the figures, the blocking element 30 is not in engagement with the engagement part 32 so that the blocking element 30 can be displaced in the displacement direction X relative to the support element 10 without hindrance and accordingly a stepless position adjustment of the steering wheel can be carried out with opened clamping mechanism 2.

In the rest position, the blocking element 30 is held on an undercut 340 of the blocking element receptacle 34. In particular, a holding section 342 of the blocking element 30 is preloaded into the undercut 340 by means of the preload spring 36 so that the blocking element 30 in the rest position is securely held in the blocking element receptacle 34. In the shown exemplary embodiment, holding section 342 and undercut 340 are configured slightly wedge-shaped, so that by generating the preload by means of the preload spring 36 the blocking element 30 is preloaded into the rest position shown in FIG. 5 and also held in this position. In particular during regular driving it can be avoided in this way that the blocking element 30 because of vehicle vibrations leaves its rest position defined by the undercut 340 and the holding section 342.

In an embodiment which is not shown, the blocking element 30 can be held during regular driving in its rest position by a magnet force of a magnet, as a result of which the wedge-shaped embodiment of the undercut can be omitted.

The blocking element receptacle 34 however is dimensioned so that the blocking element 30 can be moved in traveling direction B. In the event of a crash, the blocking element 30, through the mass of the blocking element 30, simultaneously becomes its own switching element 4, which moves the blocking element 30 because of its inert mass from the rest position into a triggering position. Through the inert mass, the switching element 4 ensures that the blocking element 30 moves within the blocking element receptacle 34 in traveling direction B, i.e. in the shown exemplary embodiment to the right, and accordingly slips out of the rest position formed by the undercut 340 and the holding section 342. Because of the preload spring 36, the blocking element 30 with its toothing 300 is then suddenly brought into engagement with the engagement part 32 and its mating toothing 320.

Figure 5:
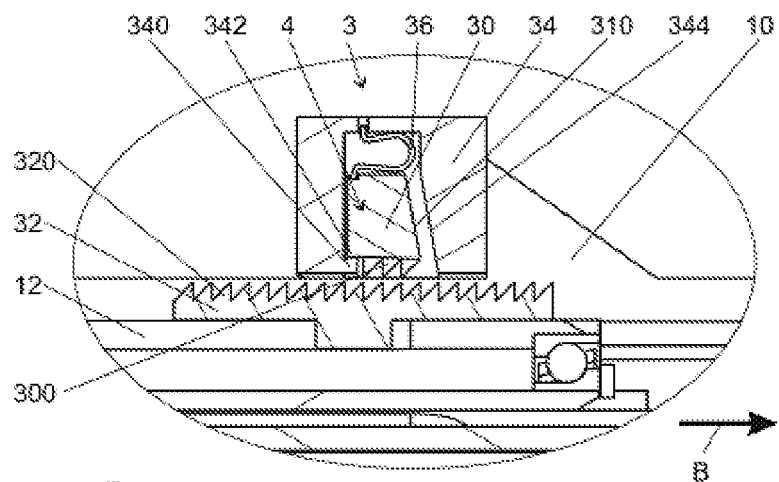
FIG. 5 is a detail view of the example blocking element shown in the preceding figures.
Figure 13:
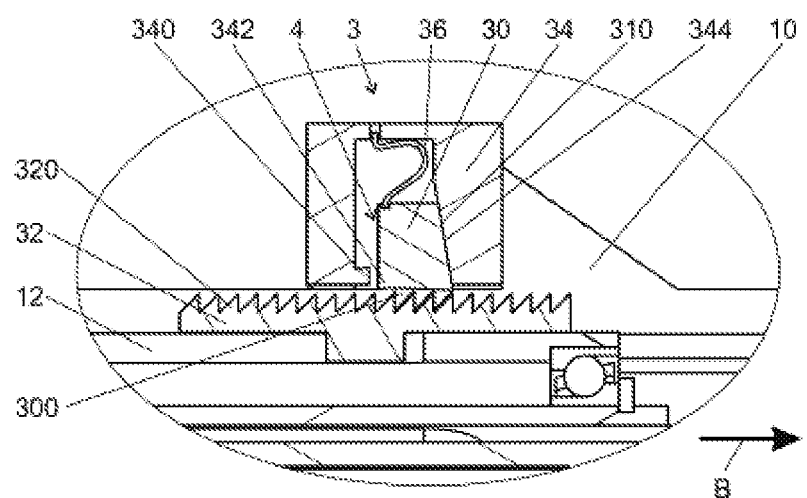
FIG. 13 is a detail view of the blocking element of FIG. 5 in engagement.

Thus, the blocking element 30, in the event of a crash, or upon the generation of a suitably high acceleration or a suitably high impulse on the switching element 4, is moved out of its rest position in the FIG. 5 in traveling direction B to the right into the triggering position and the blocking element 30 then brought into engagement with the engagement part 32 because of the preload of the preload spring 36. In FIG. 13, the relevant blocking position of the locking device 3 of FIG. 5 is shown, in which the toothing 300 of the blocking element 30 is in engagement with the mating toothing 320 of the engagement part 32.

When the locking device 3 is in the blocking position, the energy absorption can take place through the relative displacement between the fixed engagement part 32 and the adjusting element 12 and the deformation or widening of the slot 13 connected thereto.

This results in that the steering column 1, which is shown in FIGS. 1 to 5, during normal driving, can be substantially steplessly displaced in its position and in particular along the displacement direction X of the adjusting element 12 relative to the support element 10. By way of the simple clamping mechanism 2, a stepless adjustment can be achieved accordingly.

A crash locking through the locking device 3 accordingly takes place only when it is actually needed in the event of a crash. During normal driving, by contrast, merely a clamping of s the adjusting element 12 relative to the support element 10 takes place by means of the clamping mechanism 2, so that here the position of the steering wheel can be flexibly and continuously adapted to the respective driver.

The locking device 3 combined with the switching element 4 can be designed in a mechanically particularly simple manner which is schematically indicated accordingly in FIG. 5.

In order to further improve the blocking effect of the blocking element 30 in the event of a crash, the blocking element 30, on its side facing forward in traveling direction B, comprises a wedge surface 310, which comes to lie against a corresponding complementary mating wedge surface 344 of the blocking element receptacle 34, when the blocking element 30 is brought out of its rest position shown in FIG. 5 into the triggering position. Through the inert mass of the blocking element 30 which then acts as switching element 4, the wedge surface 310 comes to lie against the mating wedge surface 344 of the blocking element receptacle 34. Thus, the blocking element 30 is pressed, quasi in a self-locking manner, onto the engagement part 32 in particular when the adjusting element 12 is moved in traveling direction B relative to the support element 10. Accordingly, the locking device 3, by the design of the wedge surface 310 and of the mating wedge surface 344, provides self-locking, which becomes independent of the preload of the preload spring 36.

Figure 6:
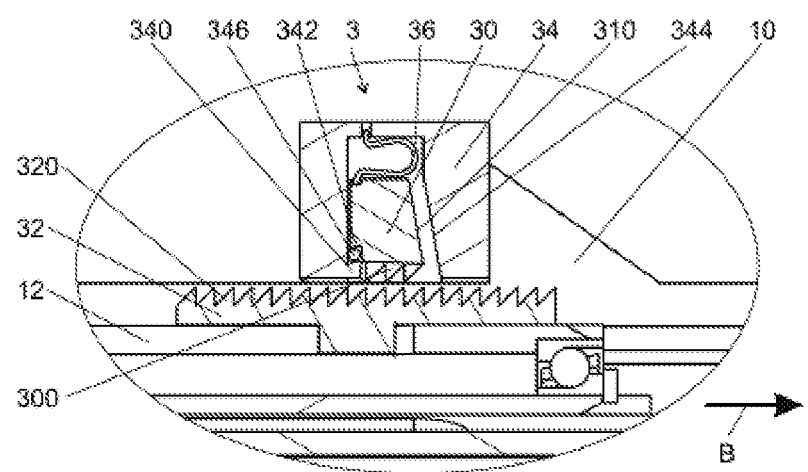
FIG. 6 is a schematic sectional view of another example blocking element.

In FIG. 6, an alternative locking device 3 is shown, which has a substantially similar construction as that shown in FIG. 5, wherein however between the undercut 340 of the blocking element receptacle 34 and the holding section 342 of the blocking element 30 a rolling element 346 is arranged so that a defined triggering of the blocking element 30 which then acts as switching element 4 out of the rest position shown in FIG. 6 into the activation position is achieved when a corresponding acceleration or a corresponding impulse is exerted on the switching element 4 in traveling direction B. By providing the rolling element 346 it can be avoided, in particular, that through the direct pressing together of the surfaces of the undercut 340 and of the holding section 342, as is shown in FIG. 5, a no longer defined switching behavior of the switching element 4 because of corrosion or changing surface characteristics is achieved. By using a rolling element 346, a more defined triggering behavior of the switching element 4 can be achieved, wherein the mass of the switching element 30 required for the triggering can be reduced since this embodiment version has a lower system friction than the locking device shown in FIG. 5.

Figure 7:
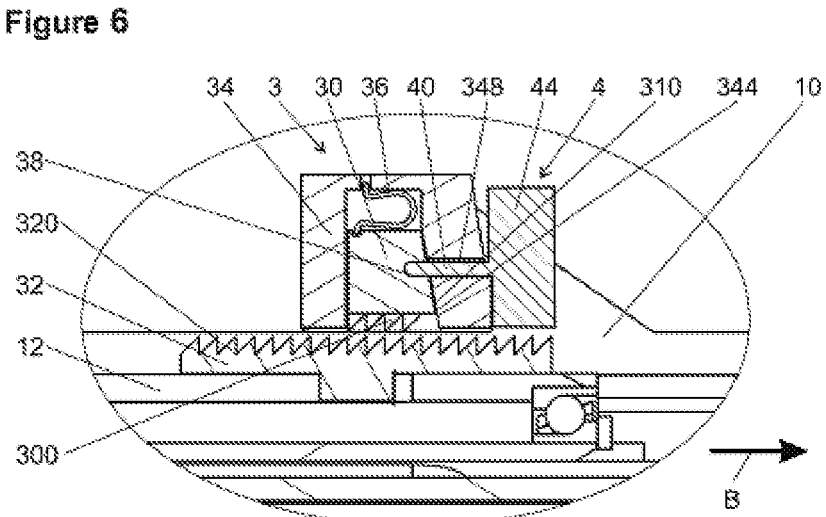
FIG. 7 is a schematic sectional view of still another example blocking element.

In FIG. 7, a further exemplary embodiment of the locking device 3 is shown, in the case of which in addition to the blocking element 30, which is received in the blocking element receptacle 34 via a preload spring 36, a separate switching element 4 with a mass body 44 is provided, which comprises a locking pin 40, which engages in a corresponding locking groove 38 of the blocking element 30. The locking pin 40 in this case engages through a recess 348 in the blocking element receptacle 34, so that during normal driving the blocking element 30 preloaded by the preload spring 36 is held in the rest position. When a high acceleration or a corresponding impulse occurs, the switching element 4, because of the inertia of the mass body 44, however is moved forward, in the exemplary embodiment shown in FIG. 7, relative to the blocking element receptacle 34 and relative to the blocking element 30 in traveling direction B in such a manner that the locking pin 40 comes out of engagement with the locking groove 38. Accordingly, the energy stored in the preload spring 36 is liberated and the blocking element 30 comes into engagement with its toothing 300 with the mating toothing 320 of the engagement part 32.

Figure 8:
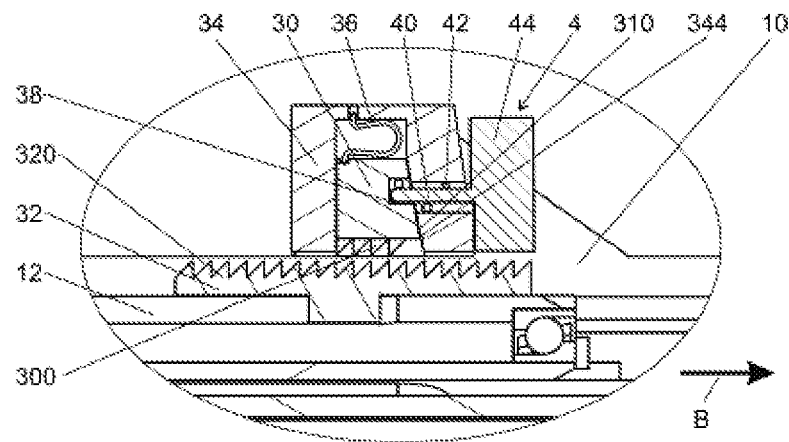
FIG. 8 is a schematic sectional view of another example blocking element.

In FIG. 8, a further exemplary embodiment is shown, in the case of which a switching element 4 is provided, which has a similar construction as the one shown in FIG. 7, wherein in this case however rolling elements 42 are additionally provided, via which the locking pin 40 is mounted both in the blocking element receptacle 34 and also in the locking groove 38 of the blocking element 30 and the recess 348 in the blocking element receptacle 34. In this way, reliable extraction or disengaging of the locking pin 40 from the locking groove 38 can be achieved when a predetermined acceleration or a predetermined impulse has been exceeded. The switching element 4 in this case is again brought out of engagement with the blocking element 30 in traveling direction B toward the front so that the energy stored in the preload spring 36 can bring the blocking element 30 in to engagement with the engagement part 32 perpendicularly to the traveling direction B, and accordingly a locking of the engagement part 32 relative to the support element 10 in displacement direction X and in traveling direction B can be achieved and to make possible an energy absorption through the relative displacement of adjusting element 12 to the engagement part 32 and the deformation of the slot 13 by the engagement part 32 connected thereto.

Figure 9:
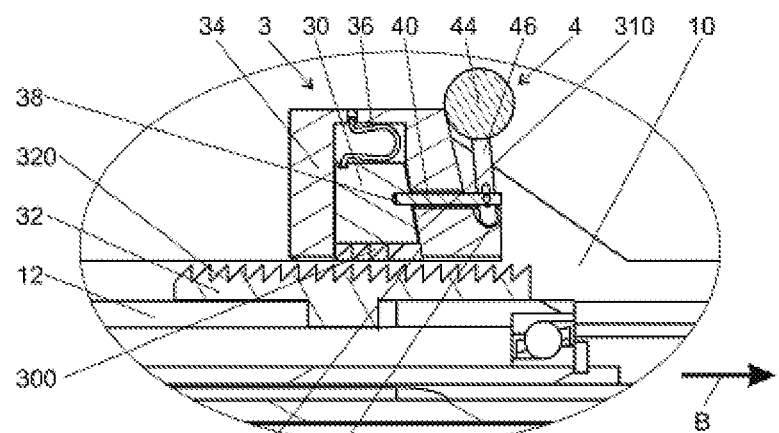
FIG. 9 is a schematic sectional view of yet another example blocking element with a switching element articulated via a lever mechanism.

In FIG. 9, a further exemplary embodiment is shown, wherein the switching element 4 in this case is connected to a locking pin 40 via a lever arm 46. The locking pin 40 in turn engages in a locking groove 38 of the blocking element 30 preloaded in the locking direction via a preload spring 36. A mass body 44 is provided, which via the lever arm 46 acts on the locking pin 40. Accordingly, the force, which is exerted on the locking pin 40 by the mass inertia of the mass body 44, or of the switching element 4, can be increased via the lever arm 46. Thus, the mass of the mass body 44 can either be reduced or the preload of the preload spring 36 can be increased, wherein a secure triggering of the blocking element 30 is then still achieved. The lever arm 46, in the shown exemplary embodiment, is received in a mounting region 460, without a particular fixing taking place here. In order to avoid jamming of the lever arm 46 during the disengagement of the locking pin 40 from the locking groove 38, the coupling between lever arm 46 and the locking pin 40 comprises an elongated hole in order to ensure a displacement offset.

Figure 10:
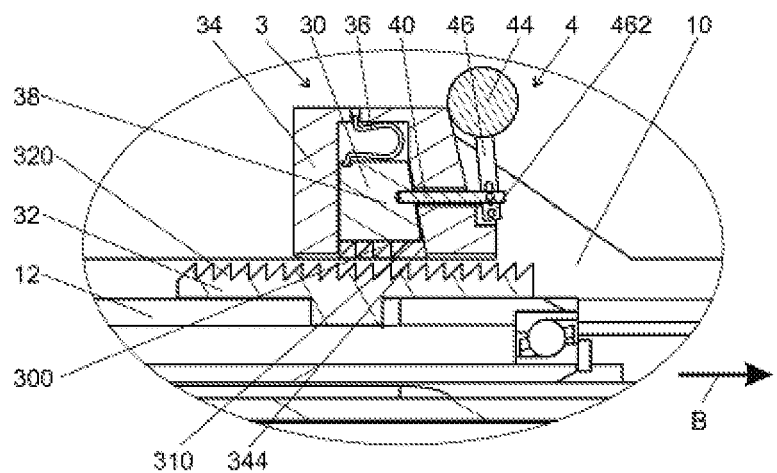
FIG. 10 is a schematic sectional view of an example blocking element with a switching element articulated via a lever mechanism.

In the exemplary embodiment shown in FIG. 10, a similar construction is shown in principle as that in FIG. 9. Here, merely the lever arm 46 is arranged pivotably about a defined pivot axis 462, so that a defined pivoting of the mass body 44 about the pivot axis 462 can be achieved in order to move the locking pin 40 out of engagement with the locking groove 38.

Figure 11:
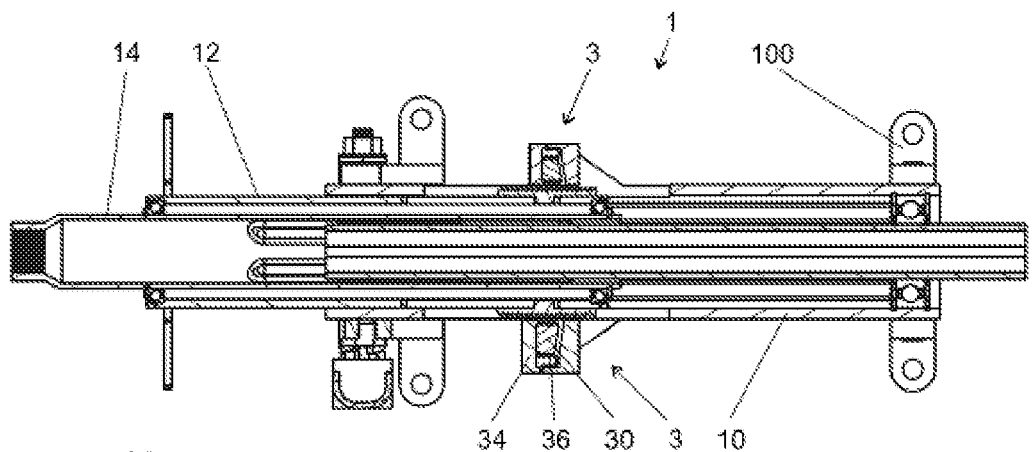
FIG. 11 is a schematic sectional view through another example steering column that comprises two blocking elements.

In FIG. 11, a steering column 1 is shown in a schematic representation, wherein two locking devices 3 are provided, which are arranged acting on opposite sides of the support element 10 on the adjusting element 12. In this way, either a redundant design of the locking device 3 can be achieved or the individual locking devices can be dimensioned smaller in order to reduce for example the installation space or the use of material. Furthermore, the locking provided via the two locking devices will lead to a symmetrical locking of the adjusting element 12 relative to the support element 10, so that secure locking is achieved in the event of a crash.

Figure 12:
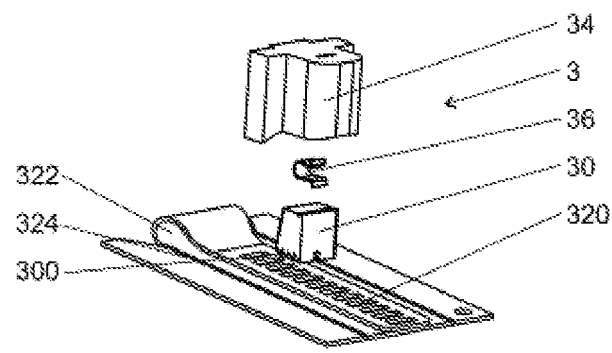
FIG. 12 is a schematic perspective view of engagement of an example blocking element in an example energy absorption element.

In FIG. 12, a locking device 3 is schematically shown, in the case of which the blocking element 30 with its toothing 300 engages into the mating toothing 320 of an engagement part 32 designed as energy absorption element. The engagement part 32 designed as energy absorption s element, for this purpose, comprises a plate strap 322 which can tear open along tear lines 324 and simultaneously a deformation of the plate strap 322 takes place in the event of a crash.

Accordingly, by way of the locking device 3, a secure locking of the adjusting element 12 on the support element 10 can be achieved and simultaneously an energy absorption by means of the engagement part 32 designed as energy absorption element can be achieved. The engagement part 32, which is designed as energy absorption part here, can be connected to the adjusting element 12 in a fixed manner so that upon a locking via an engagement of the blocking element 30 correspondingly the support element 10 is locked relative to the adjusting element 12 subject to the intermediate connection of the energy absorption element in the form of the engagement part 32 and a displacement of the adjusting unit 12 relative to the support element 10 for energy absorption takes place through the plastic deformation of the energy absorption element.

In an embodiment which is not shown, the engagement part 32 can be non-detachably or unitarily connected to the adjusting unit 12 so that following the engagement of the toothing 300 of the blocking element into the mating toothing 320 of the engagement element a relative displacement of the adjusting unit 12 relative to the support element 10 is prevented.

The toothing 300 and the mating toothing 320 used in the previously described embodiment versions can always be replaced by another form-fit latching, wherein these one or more form-fit elements and accordingly corresponding mating form-fit elements can be brought into engagement with one another.

As far as applicable, all individual features which are shown in the individual exemplary embodiments can be combined with one another and/or exchanged without leaving the scope of the invention.

LIST OF REFERENCE CHARACTERS

1 Steering column
10 Support element
12 Adjusting element
13 Slot
14 Steering spindle
100 Console part
110 Cheek
112 Elongated hole
120 Pivot axis
2 Clamping mechanism
20 Clamping axis
22 Clamping lever
3 Locking device
30 Blocking element
32 Engagement part
34 Blocking element receptacle
36 Preload spring
38 Locking groove
300 Toothing
310 Wedge surface
320 Mating toothing
322 Plate strap
324 Tear line
340 Undercut
342 Holding section
344 Mating wedge surface
346 Rolling element 348 Recess
4 Switching element
40 Locking pin
42 Rolling element
44 Mass body
46 Lever arm
460 Mounting region
462 Pivot axis
X Displacement direction
Y Pivot direction
B Traveling direction

The invention claimed is:

1. A steering column for a motor vehicle, the steering column comprising:
 a support element;
 an adjusting element that is displaceable relative to the support element for the rotatable mounting of a steering spindle;
 a locking device for locking the adjusting element relative to the support element in a crash event, wherein the locking device comprises a blocking element that is disposed on the support element and is engageable with an engagement part of the adjusting element, wherein the blocking element is configured as a blocking block that is movably disposed in a vehicle movement direction in a blocking element receptacle on the support element; and
 a switching element for causing engagement of the blocking element in the engagement part in a crash event, wherein the switching element causes the engagement by way of its mass inertia, wherein a movement direction of the switching element is different than a movement direction of the blocking element.

2. The steering column of claim 1 wherein the blocking element is held in the blocking element receptacle in a rest position by an undercut.

3. The steering column of claim 2 further comprising a rolling element disposed between the undercut of the blocking element and a holding section of the blocking element.

4. The steering column of claim 2 wherein the blocking element has a self-locking design and comprises a wedge surface formed in the vehicle movement direction, wherein the wedge surface can be brought to lie against a mating wedge surface of the blocking element receptacle in a crash event to achieve self-locking of the blocking element.

5. The steering column of claim 1 wherein the locking device is a first locking device, the steering column further comprising a second locking device.

6. The steering column of claim 5 wherein the first and second locking devices are disposed on sides of the adjusting element opposite one another.

7. The steering column of claim 1 wherein the engagement part is configured as an energy absorption element.

8. The steering column of claim 1 wherein the switching element is movable between a rest position in which the blocking element is disengaged with the engagement part and a triggering position in which the blocking element is engaged with the engagement part.

9. The steering column of claim 1 wherein the blocking element for engaging is movable in a direction substantially perpendicular to an axis of the steering spindle.

10. The steering column of claim 1 wherein the switching element is formed by the blocking element, wherein a mass inertia of the blocking element causes the engagement.

11. A steering column for a motor vehicle, the steering column comprising:
 a support element;
 an adjusting element that is displaceable relative to the support element for the rotatable mounting of a steering spindle;
 a locking device for locking the adjusting element relative to the support element in a crash event, wherein the locking device comprises a blocking element that is disposed on the support element and is engageable with an engagement part of the adjusting element; and
 a switching element for causing engagement of the blocking element in the engagement part in a crash event, wherein the switching element causes the engagement by way of its mass inertia, wherein a movement direction of the switching element is different than a movement direction of the blocking element,
 wherein the switching element comprises a mass body and holds the blocking element in a rest position via a locking pin, wherein the locking pin is mounted via rolling bodies in a locking groove of the blocking element.

12. The steering column of claim 11 wherein the switching element is movable between a rest position in which the blocking element is disengaged with the engagement part and a triggering position in which the blocking element is engaged with the engagement part.

13. The steering column of claim 11 wherein the blocking element for engaging is movable in a direction substantially perpendicular to an axis of the steering spindle.

14. The steering column of claim 11 wherein the switching element is formed by the blocking element, wherein a mass inertia of the blocking element causes the engagement.

15. The steering column of claim 11 wherein the locking device is a first locking device, the steering column further comprising a second locking device.

16. A steering column for a motor vehicle, the steering column comprising:
 a support element;
 an adjusting element that is displaceable relative to the support element for the rotatable mounting of a steering spindle;
 a locking device for locking the adjusting element relative to the support element in a crash event, wherein the locking device comprises a blocking element that is disposed on the support element and is engageable with an engagement part of the adjusting element; and
 a switching element for causing engagement of the blocking element in the engagement part in a crash event, wherein the switching element causes the engagement by way of its mass inertia, wherein a movement direction of the switching element is different than a movement direction of the blocking element,
 wherein the switching element comprises a mass body and holds the blocking element in a rest position via a locking pin, wherein the locking pin is connected to the mass body via a lever arm.

17. The steering column of claim 16 wherein the switching element is movable between a rest position in which the blocking element is disengaged with the engagement part and a triggering position in which the blocking element is engaged with the engagement part.

18. The steering column of claim 16 wherein the blocking element for engaging is movable in a direction substantially perpendicular to an axis of the steering spindle.

19. The steering column of claim 16 wherein the switching element is formed by the blocking element, wherein a mass inertia of the blocking element causes the engagement.

20. The steering column of claim 16 wherein the engagement part is configured as an energy absorption element.

\* \* \* \* \*